(12) United States Patent
Schreck et al.

(10) Patent No.: US 7,154,700 B1
(45) Date of Patent: Dec. 26, 2006

(54) DISK DRIVE THAT STORES TIME VARYING CHARACTERISTICS THEREOF WITH DATA FROM A HOST DEVICE AND ASSOCIATED METHODS

(75) Inventors: Erhard Schreck, San Jose, CA (US); Donald Brunnett, Pleasanton, CA (US); Nick Warner, Livermore, CA (US); John Mead, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 93 days.

(21) Appl. No.: 11/042,931

(22) Filed: Jan. 25, 2005

Related U.S. Application Data

(60) Provisional application No. 60/587,406, filed on Jul. 31, 2004.

(51) Int. Cl.
*G11B 5/596* (2006.01)

(52) U.S. Cl. .................................................. 360/77.04

(58) Field of Classification Search ............. 360/77.04, 360/77.07, 78.04, 77.08, 75, 31, 25, 68, 46, 360/48, 76, 77.02; 369/13.02; 714/752
See application file for complete search history.

(56) References Cited

U.S. PATENT DOCUMENTS

| | | | | |
|---|---|---|---|---|
| 4,167,109 A | * | 9/1979 | Gold | ............................. 374/1 |
| 4,691,258 A | * | 9/1987 | Kobayashi et al. | ...... 360/77.02 |
| 4,979,054 A | * | 12/1990 | McCullough et al. | ......... 360/48 |
| 5,377,058 A | * | 12/1994 | Good et al. | .................... 360/75 |
| 5,835,299 A | * | 11/1998 | Lee et al. | ....................... 360/76 |
| 6,101,053 A | * | 8/2000 | Takahashi | ..................... 360/46 |
| 6,359,749 B1 | * | 3/2002 | Fukushima | ................. 360/121 |
| 6,671,232 B1 | * | 12/2003 | Stupp | ...................... 369/13.02 |
| 6,781,786 B1 | * | 8/2004 | Ishii | ........................ 360/78.04 |
| 6,914,738 B1 | * | 7/2005 | Fujiwara et al. | .............. 360/68 |
| 6,972,920 B1 | * | 12/2005 | Kim et al. | ..................... 360/75 |
| 6,987,628 B1 | * | 1/2006 | Moline et al. | ................. 360/31 |
| 7,031,091 B1 | * | 4/2006 | Ichihara et al. | ............... 360/75 |
| 7,036,066 B1 | * | 4/2006 | Weibel et al. | .............. 714/752 |
| 7,046,463 B1 | * | 5/2006 | Gay Sam et al. | ............. 360/25 |
| 2004/0174627 A1 | * | 9/2004 | Kim et al. | ..................... 360/31 |
| 2005/0078393 A1 | * | 4/2005 | Cho | ............................ 360/31 |
| 2005/0078404 A1 | * | 4/2005 | Kuramoto et al. | ............ 360/75 |

* cited by examiner

*Primary Examiner*—Fred F. Tzeng
(74) *Attorney, Agent, or Firm*—Myers Bigel Sibley & Sajovec, PA

(57) ABSTRACT

A disk drive includes a rotatable data storage disk, a transducer, and a controller. The transducer is configured to write data on the disk. The controller is configured to receive data from a host device, to measure at least one parameter that is indicative of a time varying characteristic associated with the disk drive, and to write the measured parameter and the data on the disk through the transducer. The time varying characteristic that is measured may include temperature, air pressure, flying height of the transducer relative to the disk, and/or a position error signal (PES) that is indicative of a radial location of the transducer relative to a desired location along a track on the disk. The measured parameters may be embedded within the data that is written on the disk, they may be written in a same track and/or sector as the data, and/or they may be written on a reserved portion of the disk.

18 Claims, 4 Drawing Sheets

DISK DRIVE THAT STORES TIME VARYING CHARACTERISTICS THEREOF WITH DATA FROM A HOST DEVICE AND ASSOCIATED METHODS

RELATED APPLICATION

This application claims the benefit of and priority to a U.S. Provisional Patent Application Ser. No. 60/587,406, filed Jul. 13, 2004, the disclosure of which is hereby incorporated herein by reference as if set forth in its entirety.

FIELD OF THE INVENTION

The present invention relates to disk based storage devices and, more particularly, to storing data on a disk.

BACKGROUND OF THE INVENTION

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16.

The actuator arm assembly 18 includes a transducer 20 (or head) mounted to a flexure arm 22 which is attached to an actuator arm 24 that can rotate about a pivot bearing assembly 26. The actuator arm assembly 18 also includes a voice coil motor 28 which moves the transducer 20 relative to the disk 12. The spin motor 14, and actuator arm assembly 18 are coupled to a number of electronic circuits 30 mounted to a printed circuit board 32. The electronic circuits 30 typically include a digital signal processor (DSP), a microprocessor-based controller and a random access memory (RAM) device.

Referring now to the illustration of FIG. 2, the disk stack 12 typically includes a plurality of data storage disks 34, each of which may have a pair of disk surfaces 36, 36. The disks 34 are mounted on a cylindrical shaft and are designed to rotate about axis 38. The spindle motor 14 as mentioned above, rotates the disk stack 12. Although the disks 34 are described as magnetic disks for purposes of illustration, they may alternatively be optical disks or any other type of storage disk which can store data thereon.

Referring now to the illustration of FIGS. 1 and 3, the actuator arm assembly 18 includes a plurality of the transducers 20, each of which correspond to one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36. The transducers 20 are configured to fly adjacent to the disk surfaces 36 on air bearings.

Although the disk stack 12 is illustrated as having a plurality of disks 34, it may instead contain a single disk 34, with the actuator arm assembly 18 having a corresponding single actuator arm 24.

FIG. 4 further illustrates one of the disks 34. Data is stored on the disk 34 within a number of concentric tracks 40 (or cylinders). Each track is divided into a plurality of radially extending sectors 42 on the disk 34. Each sector 42 is further divided into a servo sector 44 and a data sector 46. The servo sectors 44 of the disk 34 are used to, among other things, accurately position the transducer 20 so that data can be properly written onto and read from the disk 34. The data sectors 46 are where non-servo related data (i.e., user data) is stored and retrieved. Such data, upon proper conditions, may be overwritten.

To accurately write data to and read data from the data sectors 46 of the disk 34, it is desirable to maintain the transducer 20 at a relatively fixed position with respect to a centerline of a designated track 40 during writing and reading operations (called a track following operation). To assist in controlling the position of the transducer 20 relative to the tracks 40, the servo sectors 44 contain, among other things, servo information in the form of servo burst patterns that include one or more groups of servo bursts, as is well-known in the art.

Various characteristics that are associated with the disk drive 10 can affect its ability to accurately write data on the disk 34. For example, air density can affect the flying height of the transducer 20 over the disk 34, dust/debris on the disk 34 can affect the sensitivity of the communicative coupling between the transducer 20 and the disk 34, and temperature can affect the reliability and operation of various components of the disk drive 10.

SUMMARY OF THE INVENTION

Some embodiments of the present invention provide a method of storing measured parameters with data on a disk in a disk drive. At least one parameter that is indicative of a time varying characteristic associated with the disk drive is measured. The measured parameter, and data that are received from a host device, are written on the disk through a transducer.

The measured time varying characteristic can include, but is not limited to, temperature, air pressure, flying height of the transducer relative to the disk, a position error signal (PES) that is indicative of a radial location of the transducer relative to a desired location along a track on the disk, a time and/or date associated with when data was stored on the disk, and/or how many times the disk drive has been powered on. One or more of the parameters may be measured during at least a portion of time while data from the host device is written to the disk.

For example, the parameters may be measured while writing data on various data tracks and sectors of the disk. Accordingly, the measured parameters can thereby indicate the conditions associated with various components in the disk drive when the data was written on the disk. The measured parameters can be associated with particular portions of the written data so that the conditions, that were present when the associated data was written, can be later determined. The measured parameters may then be used to improve the accuracy with which data is read from the disk, to assist with diagnosis of malfunction of the disk drive, and/or to assist with remedying such malfunction.

The measured parameters may be written onto the disk in a manner that associates the measured parameters with particular portions of data that were written during, or proximate in time to the measurement of the parameters. The measured parameters may be written adjacent to the associated data on the disk. For example, the measured parameters may be written in a same track and/or sector on the disk as at least a portion of the associated data, and/or the measured parameters may be embedded within the associated data. Alternatively, or additionally, the measured parameters may be written on a portion of the disk that is reserved for storing such parameters.

In some embodiments of the present invention, a disk drive includes a rotatable data storage disk, a transducer, and a controller. The transducer is configured to write data on the disk. The controller is configured to receive data from a host device, to measure at least one parameter that is indicative of a time varying characteristic associated with the disk drive, and to write the measured parameter and the data on the disk through the transducer.

DETAILED DESCRIPTION OF THE INVENTION

Figure 1:
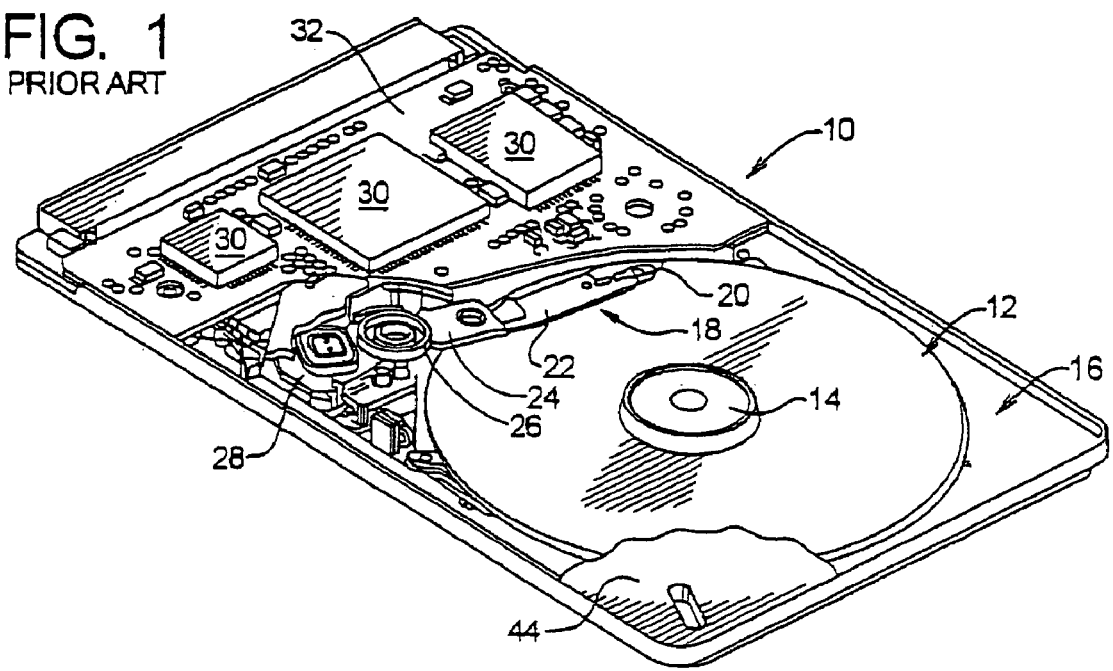
FIG. 1 is a perspective view of a conventional disk drive.
Figure 2:
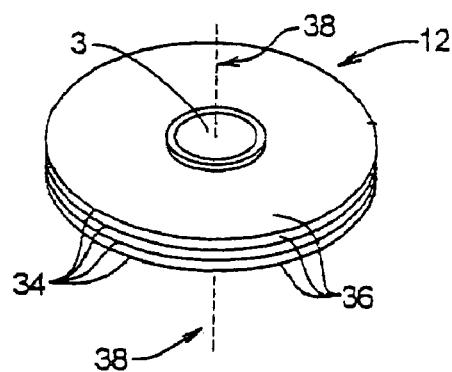
FIG. 2 is a perspective view of a conventional disk stack having a plurality of hard disks.
Figure 3:
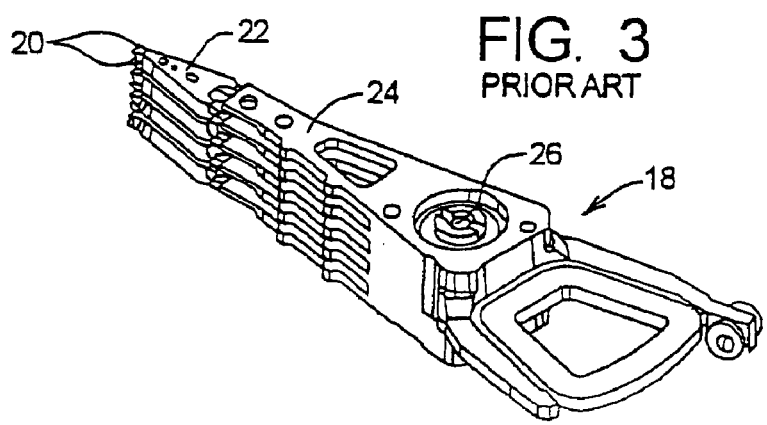
FIG. 3 is a perspective view of a portion of an actuator arm assembly having a plurality of actuator arms.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. In the drawings, the size and relative sizes of regions may be exaggerated for clarity.

Some embodiments of the present invention provide disk drives and methods. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams, including operational flow charts, of disk drives and methods according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 5:
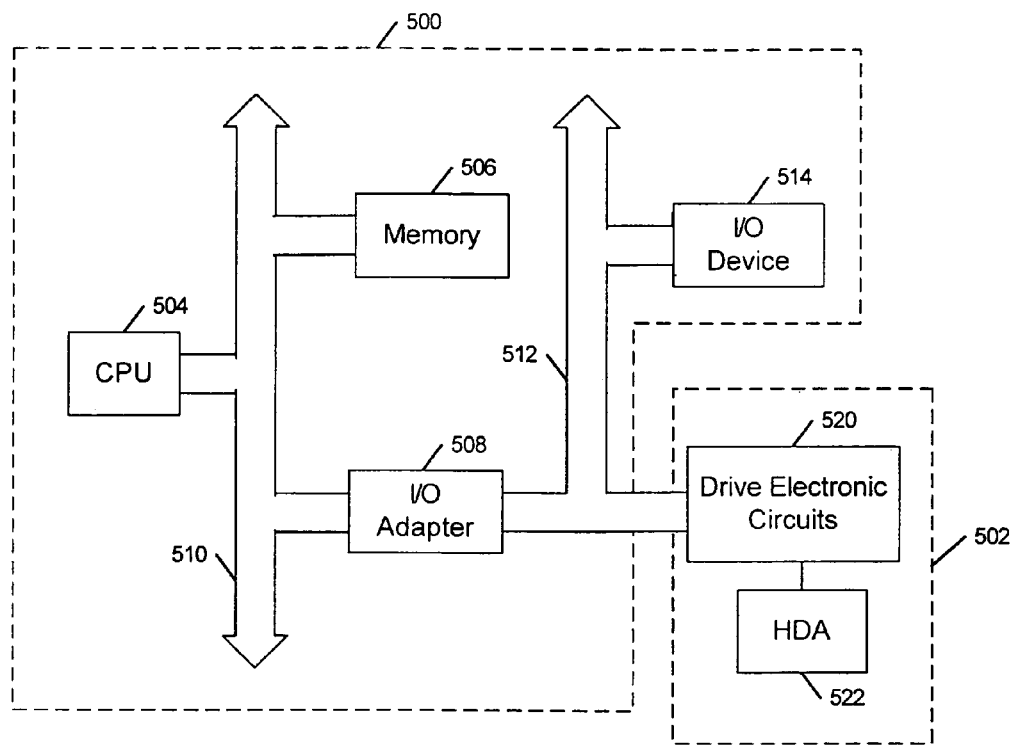
FIG. 5 is a block diagram of a host device that is connected to a disk drive, such as the disk drive shown in FIG. 1, and that is configured in accordance with various embodiments of the present invention.

FIG. 5 is a block diagram of a host device 500 that is connected to a disk drive 502, which may be configured as was described for the disk drive 10 of FIG. 1. In accordance with various embodiments of the present invention, the disk drive 502 is also configured to measure one or more parameters that are associated with the disk drive 502, and to store the measured parameters with data from the host device 500.

The exemplary host device 500 includes a central processing unit ("CPU") 504, a main memory 506, and Input/Output (I/O) bus adapter 508, all interconnected by a system bus 510. Coupled to the I/O bus adapter 508 is I/O bus 512, that may be, for example, a small computer system interconnect (SCSI) bus, firewire bus, and/or a universal serial bus. The I/O bus 512 supports various I/O peripheral devices 514 and may be connectable to the disk drive 502. Data from the CPU 504, the I/O device 514, and/or other components that may be connected via the buses 510, 512 can be stored in the disk drive 502. The disk drive 502 includes drive electronic circuits 520, which may be included within the electronic circuits 30 of FIG. 1, and a head disk assembly 522 ("HDA") that can include the disk 34, actuator assembly 18 and voice coil motor 28 of FIG. 1.

Figure 6:
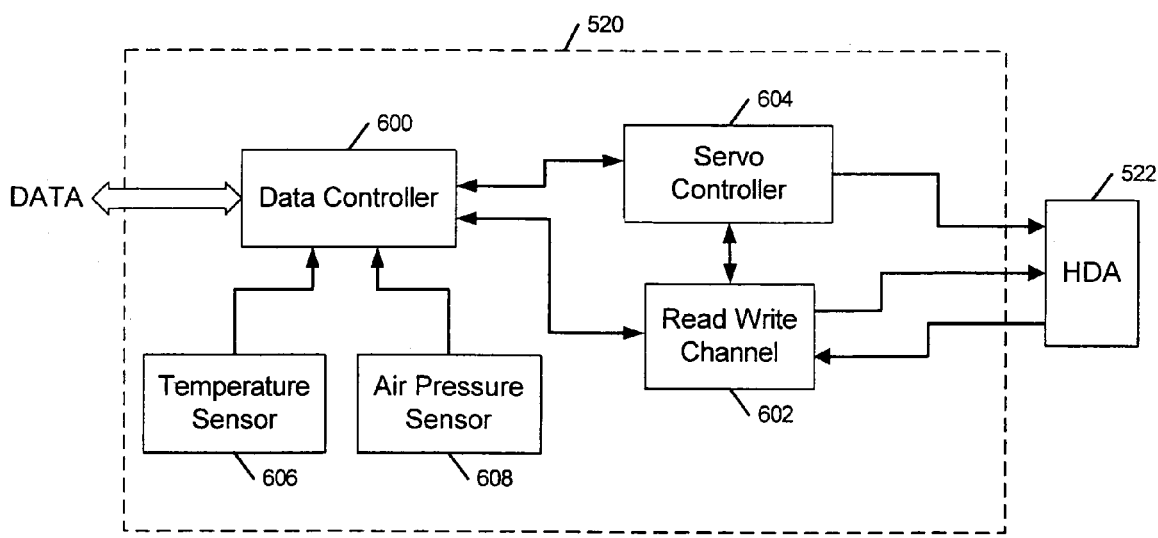
FIG. 6 is a block diagram of a controller, within the electronic circuits of FIG. 5, in accordance with some embodiments of the present invention.

FIG. 6 is a block diagram of at least a portion of the drive electronic circuits 520 of FIG. 5 and associated methods, in accordance with some embodiments of the present invention. The electronic circuits 520 can include a data controller 600, a read/write channel 602, a servo controller 604, a temperature sensor 606, and an air pressure sensor 608. The servo controller 604 can communicate with the HDA 522 in a conventional manner to seek and follow selected tracks on the disk 34.

The read/write channel 602 may operate in a conventional manner to convert data between the digital form used by the data controller 600 and the analog form used by the transducer 20. The transducer 20 generates a read signal based on the servo information (including preamble and servo burst patterns) and stored data on the disk 34. The read/write channel 602 provides the read signal to the data controller 600 and the servo controller 604. The servo controller 604 uses the servo information in the read signal to perform seek and track following operations of the transducer 20 relative to data tracks 40. The data controller 600 communicates with the read/write channel 602 to read data from the disk 34, and provide the read data to the host device 500, and to write data from the host device 500 to the disk 34.

The temperature sensor 606 is configured to generate a temperature signal based on a sensed temperature of, for example, air in the disk drive 502, one or more components of the drive electronics 520, and/or the transducer 20. The air pressure sensor 608 is configured to generate a pressure signal based on a sensed air pressure in the disk drive 502. Accordingly, the air pressure sensor 608 can provide an indication of altitude of the disk drive 502.

Figure 4:
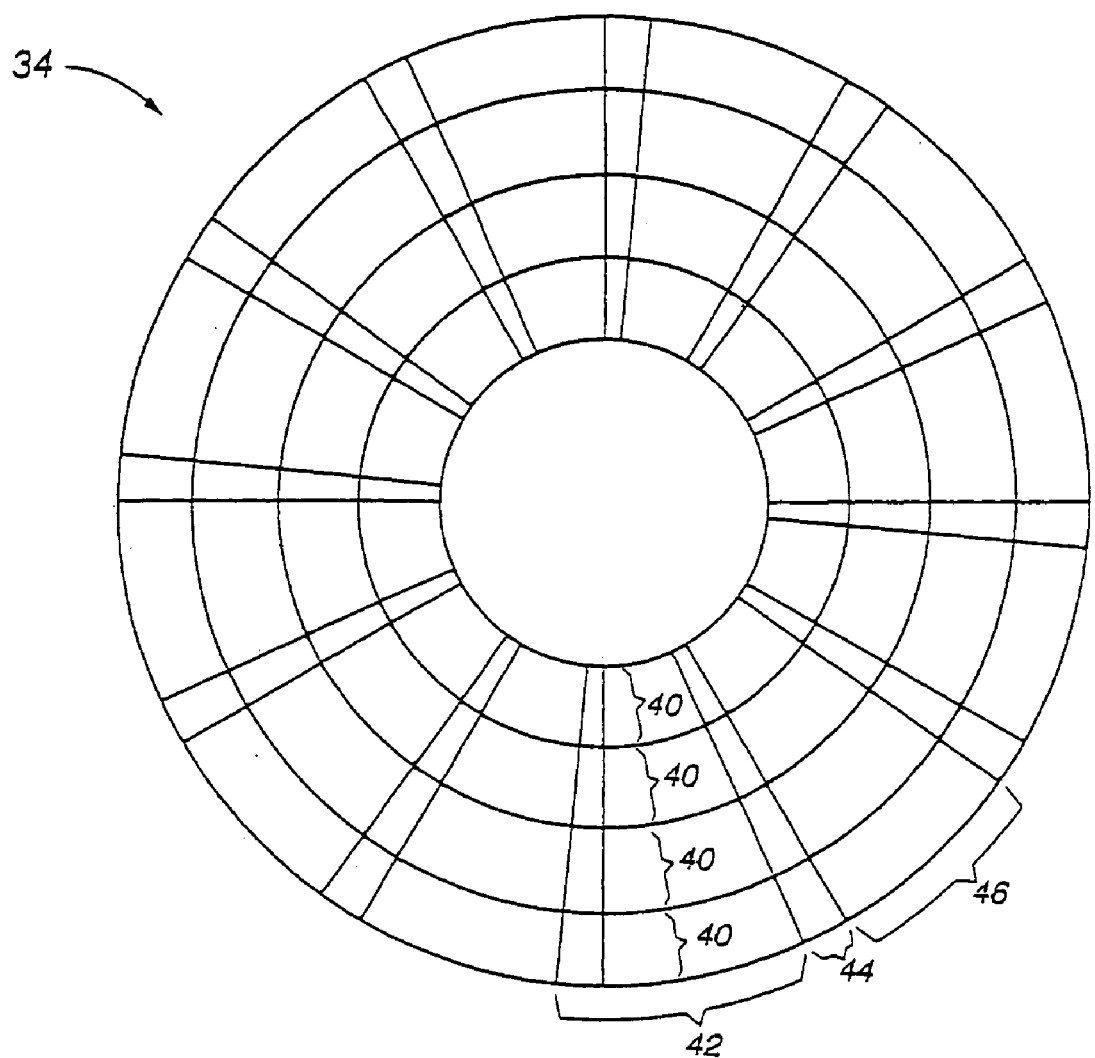
FIG. 4 is a top view of a conventional disk and illustrates tracks and sectors, with each of the sectors being divided into a servo sector and a data sector.

The data controller 600 is configured to measure at least one parameter that is indicative of a time varying characteristic associated with the disk drive 502, and to write the measured parameter on the disk 34 through the read/write channel 602 and the transducer 20. The time varying characteristic that is measured by the data controller 600 can include, but is not limited to, temperature, air pressure, flying height of the transducer 20 relative to the disk 34, and/or a position error signal (PES) that is indicative of a radial location of the transducer 20 relative to a desired location along (e.g., a centerline of) a selected one of the tracks 40 (FIG. 4). The measured parameter may additionally, or alternatively, be a time stamp and/or a date stamp that is indicative of when data was stored on the disk 34, and/or the measured parameter may be indicative of how many times the disk drive has been powered on and/or how many times another defined event associated with the disk drive has occurred.

The data controller 600 can measure temperature via the temperature signal from the temperature sensor 606, and can measure air pressure via the pressure signal from the air pressure sensor 608. The data controller 600 may measure flying height of the transducer 20 relative to the disk 34 based on the read signal from the read/write channel 602. For example, the data controller 600 may measure flying height based on a strength of the read signal, such as by comparing the magnitude of the read signal with one or more threshold values. The strength of the read signal may be measured when it includes information that has an expected or calibrated signal strength, such as a preamble portion (e.g., an automatic gain control portion) of a servo region. The data controller 600 may directly measure the PES when the read signal contains the servo burst patterns from the servo region, or the servo controller 604 may generate the PES based on the servo burst patterns and provide it to the data controller 600.

The data controller 600 may measure one or more of the parameters during at least a portion of time while data from the host device 500 (FIG. 5) is written to the disk 34. For example, the parameters may be measured while writing data on various of the data tracks 40 and data sectors 46 (FIG. 4). Accordingly, the measured parameters can thereby indicate the conditions associated with various components in the disk drive 10 when the data was written on the disk 34. The measured parameters can be associated with particular portions of the written data, so that the conditions that were present when the associated data was written, can be later determined. The measured parameters may then be used to improve the accuracy with which data is read from the disk 34, to assist with diagnosis of malfunction of the disk drive 10, and/or to assist with remedying such malfunction.

For example, the measured temperature in the disk drive 10 may indicate whether the disk drive 10 has malfunctioned because of excessive temperature of one or more components of the drive electronic circuits 520 and/or the transducer 20. The measured air pressure may indicate whether the disk drive 10 has malfunctioned because of insufficient air pressure. Insufficient air pressure may result in an inadequate air bearing gap between the transducer 20 and the disk 34, which may cause excessive heating and wear of the transducer 20 and the disk 34, and which may cause excessive temperature due to insufficient heat dissipation.

The measured flying height of the transducer 20 and the PES may be used to improve read back of data, such as during error recovery when a threshold error rate is exceeded in read data. Because the flying height of the transducer 20 can affect the strength of the data component of the read signal, the data controller 600 may be configured to vary its bit detection algorithm/process for the read signal based on the measured flying height of the transducer 20. Because the PES is indicative of a centerline along which the transducer 20 wrote the data on the disk 34, the data controller 600 may radially offset the transducer 20, via the servo controller 604, based on the measured PES to improve alignment of the transducer 20 with the centerline of the written data when attempting to read the data. Thus, when a threshold error rate is exceed in read data, the data controller 600 may improve the accuracy with which it can read back the data using the measured flying height and/or the measured PES that is associated with the data.

A gradual increase in PES over time may indicate that sufficient dust/debris has accumulated-on (fouled) the transducer 20 so as to interfere with positioning of the transducer 20. The data controller 600 may respond to this PES indication by modifying how the servo controller 604 uses the PES to position the transducer 20.

The data controller 600 may write the measured parameters onto the disk 34 in a manner that associates the measured parameters with particular portions of data that were written during, or proximate in time to, the measurement of the parameters. The measured parameters may be written adjacent to the associated data on the disk 34. For example, the measured parameters may be written in a same track and/or sector of a track on the disk 34 as at least a portion of the associated data. Additionally, or alternatively, the measured parameters may be embedded within the associated data.

Figure 7:
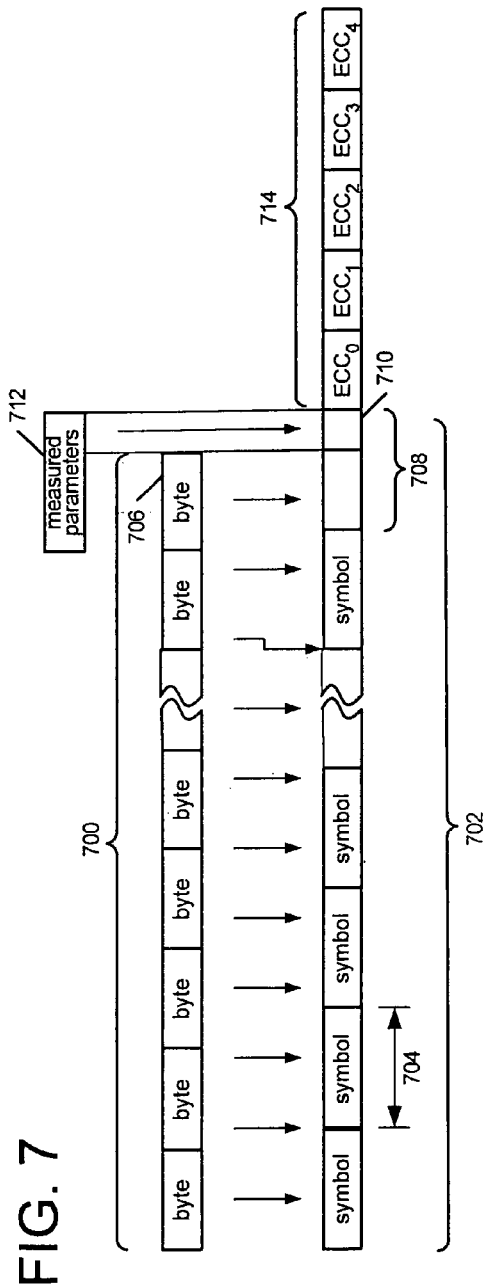
FIG. 7 is a block diagram that illustrates measured parameters that are embedded within data that is to be written to a disk, such as the disk of FIG. 4, in accordance with some embodiments of the present invention.

FIG. 7 illustrates how measured parameters may be embedded within data that is to be written on the disk 34, in accordance with some embodiments of the present invention. The data controller 600 is configured to encode data 700 that is received from the host device 500 before it is written on the disk 34. For example, the data controller 600 can encode portions (e.g., bytes) of the received data 700 as symbols 702 for writing on the disk 34. Each of the symbols 702 can have a predetermined length (e.g., 10 bits). When an end portion 706 of the received data 700 is encoded, the last encoded symbol 708 can have space, referred to as pad space 710, that is not occupied by the coded data. The pad space 710 is used to store at least a portion of the measured parameters 712.

Depending upon the length of the measured parameters 712 and the length of the pad space 710, the measured parameters 712 may be embedded within a single pad space 710 of the symbol 708, or they may be spread over a series of available pad spaces 710 of the sequential coded end symbols 708.

Cyclic redundancy check (CRC) bytes may be combined with the received data 700 before it is encoded. Error correction code (ECC) bytes 714 may be combined with the symbols 702. The symbols and associated ECC bits may then written as-is, or may be further encoded and then written on the disk 34.

In one exemplary embodiment, received data is divided into lengths of 512 bytes for coding. Two CRC bytes are added to the 512 byte data, resulting in 514 bytes, or 4112 bits (i.e., 514*8 bits/byte) for coding. When the symbol length is 10 bits, the coded data and CRC bytes are represented by 411.2 symbols. Accordingly, one of the symbols has a pad space of 8 bits (i.e., 10 bits/symbol*0.2 symbols). The 8 bit pad available for use in embedding at least a portion of the measured parameters.

The data controller 600 can separate the embedded measured parameters from the data during decoding of the data symbols that are read from the disk 34. The data, without the measured parameters, may then be provided to the host device 500, and the measured parameters may be used as explained herein.

By embedding the measured parameters with the associated data, the measured parameters can be read during the reading of the data from the disk 34. The measured parameters may then be timely used to modify the positioning of the transducer 20 and/or the detection of the data in the read signal as was explained above. Moreover, the measured parameters may be retrieved without interfering with the reading of the data (e.g., without causing seeking operations). When the measured parameters are embedded within pad spaces of symbols, they may be stored without loss of data storage capacity of the disk 34.

In some other embodiments of the present invention, the data controller 600 may embed a sequential number sequence with the data that is written on the disk 34. For example, the data controller 600 may generate the sequential number sequence by counting sectors 42 around the disk 34, so that each number in the sequence is indicative of a particular sector. The data controller 600 may then select a number in the sequence that corresponds to a sector in which data is to be written, and may embed the selected number in the data and provide the combined data to the read/write channel 602 for writing in that sector on the disk 34. The data on the disk 34 can thereby include an indication of what sector it was intended to be written. If the data is subsequently moved/copied to another sector of the disk drive 10 or to another disk drive, the number that is embedded in the data may be used to identify such movement/copying of the data. The data controller 600 may be configured to prevent access to the data, and/or to generate an indication to the host device 500, when movement/copying of the data is identified.

The data controller 600 may additionally, or alternatively, write the measured parameters to a portion of the disk 34 that is reserved for storing parameters. For example, parameters that are measured during several different write operations can be stored in a portion of the disk 34 that is reserved for storing parameters and not data.

The electronic circuits 520 may be configured to allow a user to define which parameters are measured, when they are measured (such as during write operations, or at a specified time/day/date) and/or how often they are to be measured. The user may also define whether the parameters are to be embedded in the data, or whether they are to be stored in a reserved portion of the disk 34. The size of the reserved portion of the disk 34 may also be defined by the user.

Figure 8:
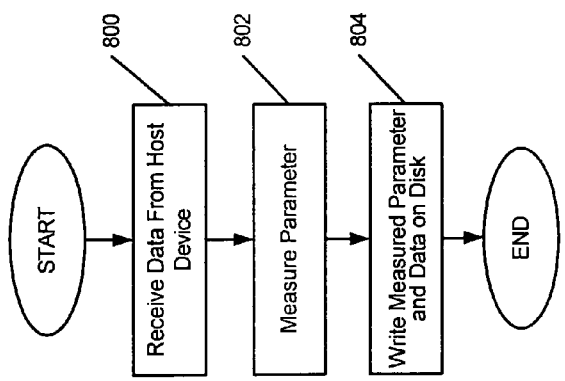
FIG. 8 illustrates a flowchart of operations for storing measured parameters with data on a disk in accordance with some embodiments of the present invention.

FIG. 8 illustrates a flowchart of operations for storing measured parameters with data on a disk in a disk drive. These operations can be suitable for use by the drive electronic circuits 520 shown in FIG. 5, and the data controller 600 shown in FIG. 6. At Block 800, data is received from a host device. At Block 802, at least one parameter that is indicative of a time varying characteristic associated with the disk drive is measured. At Block 804, the measured parameter and the data are written on the disk through a transducer. The measured parameter may be combined with the data, such as by embedding the measured parameter with the data, when it is written on the disk, and/or the measured parameter may be written to a portion of the disk that is reserved for storing such parameters.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of storing measured parameters with data on a disk in a disk drive, the method comprising:
  receiving data from a host device;
  measuring at least one parameter that is indicative of a time varying characteristic associated with the disk drive, wherein measuring at least one parameter comprises measuring temperature in the disk drive to generate a temperature value; and
  writing the measured parameter and the data on the disk through a transducer, wherein writing the measured parameter and the data comprises writing the temperature value in a same track on the disk as at least a portion of the data.

2. The method of claim 1, wherein writing the measured parameter and the data comprises writing the measured parameter in a same sector of the track as at least a portion of the data.

3. The method of claim 1, wherein writing the measured parameter and the data comprises writing the measured parameter onto a portion of the disk that is reserved for parameters that are measured during different data write operations on the disk.

4. The method of claim 1, wherein measuring temperature in the disk drive comprises measuring at least one of air temperature in the disk drive, a temperature of an electronic circuit in the disk drive, and a temperature of the transducer.

5. A method of storing measured parameters with data on a disk in a disk drive, the method comprising:
  receiving data from a host device;
  measuring at least one parameter that is indicative of a time varying characteristic associated with the disk drive, wherein measuring at least one parameter comprises measuring flying height of the transducer relative to the disk while writing at least a portion of the data on the disk; and
  writing the measured parameter and the data on the disk through a transducer, wherein writing the measured parameter and the data comprises writing the measured flying height in a same track on the disk as at least a portion of the data.

6. The method of claim 5, wherein measuring at least one parameter that is indicative of a time varying characteristic associated with the disk drive is carried out during at least a portion of time while data is written on the disk.

7. A method of storing measured parameters with data on a disk in a disk drive, the method comprising:
  receiving data from a host device;
  measuring at least one parameter that is indicative of a time varying characteristic associated with the disk drive, wherein measuring at least one parameter comprises measuring a position error signal (PES), which is indicative of a radial position of the transducer relative to a selected track on the disk where at least a portion of the data is written, to generate at least one PES value based thereon; and writing the measured parameter and the data on the disk through a transducer, wherein writing the measured parameter and the data comprises writing the at least one PES value in the selected track on the disk.

8. A method of storing measured parameters with data on a disk in a disk drive, the method comprising:

receiving data from a host device;

measuring at least one parameter that is indicative of a time varying characteristic associated with the disk drive, wherein measuring at least one parameter comprises measuring air pressure in the disk drive to generate a pressure value; and writing the measured parameter and the data on the disk through a transducer, wherein:

measuring air pressure is carried out while writing at least a portion of the data on the disk; and writing the measured parameter and the data comprises writing the pressure value in a same track on the disk as at least a portion of the data.

9. A method of storing measured parameters with data on a disk in a disk drive, the method comprising:

receiving data from a host device;

measuring at least one parameter that is indicative of a time varying characteristic associated with the disk drive; and writing the measured parameter and the data on the disk through a transducer, wherein at least a portion of the measured parameter is embedded within at least a portion of the data that is written on the disk, wherein writing the measured parameter and the data comprises:

combining at least a portion of the measured parameter with at least a portion of the received data to generate combined data having a length that is no greater than a predetermined length; and writing the combined data on the disk, and wherein combining at least a portion of the measured parameter with at least a portion of the received data comprises:

determining an available pad space between a length of at least a portion of the received data and a symbol length; and combining at least a portion of the measured parameter with at least a portion of the received data to at least partially fill the available pad space and generate the combined data.

10. The method of claim 9, further comprising encoding the combined data based on the symbol length to generate coded combined data, and wherein writing the combined data on the disk comprises writing the coded combined data on the disk.

11. A disk drive comprising:

a rotatable data storage disk;

a transducer that is configured to write data on the disk;

a controller that is configured to receive data from a host device, to measure at least one parameter that is indicative of a time varying characteristic associated with the disk drive, and to write the measured parameter and the data on the disk through the transducer; and a temperature sensor that is configured to generate a temperature value, and wherein the controller is configured to write the temperature value in a same track on the disk as at least a portion of the data.

12. The disk drive of claim 11, wherein the controller is configured to measure the at least one parameter while at least a portion the data is written on the disk.

13. The disk drive of claim 11, wherein the controller is configured to write the measured parameter onto a portion of the disk that is reserved for parameters measured during different data write operations on the disk.

14. A disk drive comprising:

a rotatable data storage disk;

a transducer that is configured to write data on the disk; and a controller that is configured to receive data from a host device, to measure at least one parameter that is indicative of a time varying characteristic associated with the disk drive, and to write the measured parameter and the data on the disk through the transducer, wherein the parameter measured by the controller is a flying height of the transducer relative to the disk while at least a portion of the data is written on the disk, and wherein the controller is configured to write the measured flying height of the transducer in a same sector and track on the disk as at least a portion of the data.

15. A disk drive comprising:

a rotatable data storage disk;

a transducer that is configured to write data on the disk; and a controller that is configured to receive data from a host device, to measure at least one parameter that is indicative of a time varying characteristic associated with the disk drive, and to write the measured parameter and the data on the disk through the transducer, wherein:

at least one of the parameters measured by the controller is a position error signal (PES), which is indicative of a radial position of the transducer relative to a track on the disk where at least a portion of the data is written; and the controller is configured to generate at least one PES value based on the measured PES, and to write the at least one PES value in a same sector and track on the disk as at least a portion of the data.

16. A disk drive comprising:

a rotatable data storage disk;

a transducer that is configured to write data on the disk;

a controller that is configured to receive data from a host device, to measure at least one parameter that is indicative of a time varying characteristic associated with the disk drive, and to write the measured parameter and the data on the disk through the transducer; and an air pressure sensor that is configured to sense air pressure, and wherein the controller is configured to generate an air pressure value based on the air pressure sensed by the air pressure sensor, and to write the air pressure value in a same track on the disk as at least a portion of the data.

17. A disk drive comprising:

a rotatable data storage disk;

a transducer that is configured to write data on the disk; and a controller that is configured to receive data from a host device, to measure at least one parameter that is indicative of a time varying characteristic associated with the disk drive, and to write the measured parameter and the data on the disk through the transducer, wherein the controller is further configured to combine at least a portion of the measured parameter with at least a portion of the received data to generate combined data having a length that is no greater than a predetermined length, and to writing the combined data on the disk; and wherein the controller is configured to determine an available pad space between a length of at least a portion of the received data and a symbol length, and to combine at least a portion of the measured parameter with at least a portion of the received data to at least partially fill the available pad space and generate the combined data.

18. The disk drive of claim 17, wherein the controller is configured to encode the combined data based on the symbol length to generate coded combined data, and to write the coded combined data on the disk.

* * * * *